United States Patent
Hashemi et al.

(10) Patent No.: US 11,252,736 B2
(45) Date of Patent: Feb. 15, 2022

(54) METHODS, NETWORK NODES, AND COMPUTER PROGRAMS FOR TRANSMIT TIMING ADJUSTMENT

(71) Applicant: Telefonaktiebolaget LM Ericsson (publ), Stockholm (SE)

(72) Inventors: Mona Hashemi, Gothenburg (SE); Henrik Sahlin, Mölnlycke (SE); Per-Erik Eriksson, Stockholm (SE); Behrooz Makki, Gothenburg (SE); Lei Bao, Gothenburg (SE); Andreas Nilsson, Gothenburg (SE); Mikael Coldrey, Borås (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 804 days.

(21) Appl. No.: 16/066,181

(22) PCT Filed: Apr. 26, 2018

(86) PCT No.: PCT/EP2018/060802
§ 371 (c)(1),
(2) Date: Jun. 26, 2018

(87) PCT Pub. No.: WO2019/206421
PCT Pub. Date: Oct. 31, 2019

(65) Prior Publication Data
US 2021/0084657 A1    Mar. 18, 2021

(51) Int. Cl.
*H04W 72/08* (2009.01)
*H04W 56/00* (2009.01)
*H04W 72/04* (2009.01)

(52) U.S. Cl.
CPC ....... *H04W 72/082* (2013.01); *H04W 56/001* (2013.01); *H04W 56/0045* (2013.01); *H04W 72/044* (2013.01)

(58) Field of Classification Search
CPC ........... H04W 72/082; H04W 56/0045; H04W 56/001; H04W 72/044; H04W 76/18; H04B 1/7117; H04L 5/0094
See application file for complete search history.

(56) References Cited

U.S. PATENT DOCUMENTS

2014/0003369 A1* 1/2014 Josiam ................ H04L 5/0094
                                                    370/329
2014/0185591 A1* 7/2014 Chizgi ................ H04B 1/7117
                                                    370/336

(Continued)

FOREIGN PATENT DOCUMENTS

| WO | 2017024516 A1 | 2/2017 |
| WO | 2017/196246 A2 | 11/2017 |
| WO | 2017/196612 A1 | 11/2017 |

OTHER PUBLICATIONS

International Search Report and Written Opinion dated Nov. 29, 2018 issued in International Application No. PCT/EP2018/060802. (14 pages).

(Continued)

*Primary Examiner* — Vinncelas Louis
(74) *Attorney, Agent, or Firm* — Sage Patent Group

(57) ABSTRACT

A method for transmit timing adjustment by a second network node includes obtaining an indication of beam link failure of a current beam that is used for ongoing communication with a first network node. The method further includes switching over to a backup beam of the current beam for continuing the ongoing communication with the first network node, and adjusting transmit timing for transmitting a signal as part of the ongoing communication in the backup beam based on earlier communicated timing information with the first network node before making any transmission of the signal on the backup beam.

23 Claims, 7 Drawing Sheets

(56) References Cited

U.S. PATENT DOCUMENTS

2016/0226563 A1    8/2016  Kohli
2017/0048775 A1*  2/2017  Kim ...................... H04W 76/18
2017/0095215 A1    4/2017  Watson et al.

OTHER PUBLICATIONS

First Examination Report dated Mar. 9, 2021 for Indian Patent Application No. 201847023878, 7 pages.

* cited by examiner

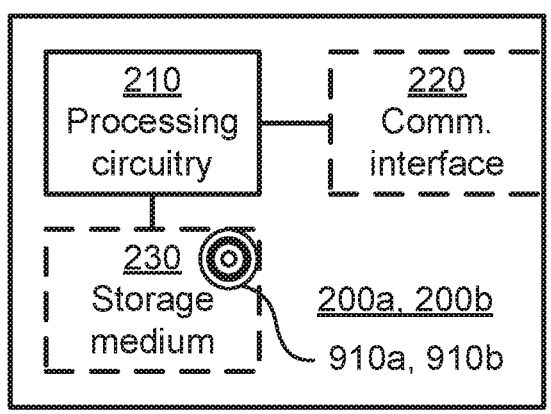
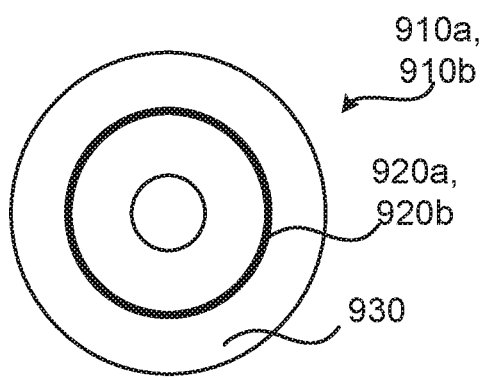
Fig. 7
Fig. 9
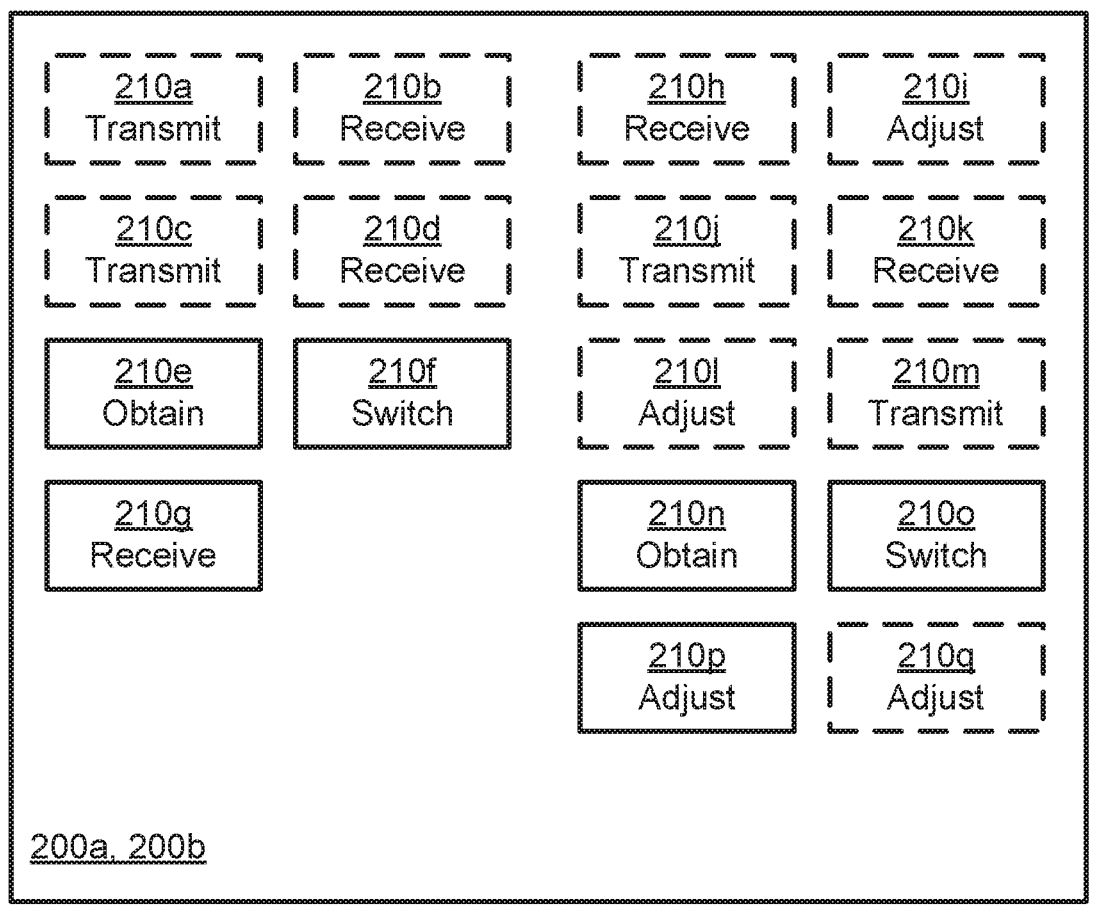
Fig. 8

METHODS, NETWORK NODES, AND COMPUTER PROGRAMS FOR TRANSMIT TIMING ADJUSTMENT

CROSS REFERENCE TO RELATED APPLICATION(S)

This application is a 35 U.S.C. § 371 National Stage of International Patent Application No. PCT/EP2018/060802, filed Apr. 26, 2018, designating the United States. The above identified applications are incorporated by reference.

TECHNICAL FIELD

Embodiments presented herein relate to a method, a second network node, a computer program, and a computer program product for transmit timing adjustment. Embodiments presented herein further relate to a method, a first network node, a computer program, and a computer program product for enabling transmit timing adjustment.

BACKGROUND

In communications networks, there may be a challenge to obtain good performance and capacity for a given communications protocol, its parameters and the physical environment in which the communications network is deployed.

One examples of a communications network is a point-to-multipoint system or multipoint-to-point system where a so-called donor network node with a wired connection to a core network is wirelessly connected to one or more relay network nodes. FIG. 1 schematically illustrates such a communications network bow comprising two network nodes 200a, 200b, where only the network node 200a has a wired connection to the core network 120. In turn, the core network 120 could be connected to a service network, such as the Internet. Each network node 200a, 200b is operatively connected to a respective radio access network node 400a, 400b, which could be any of a radio base station, base transceiver station, node B (NB), evolved node B (eNB), gNB, access point, access node, or transmission and reception point (TRP). Collectively, the radio access network nodes 400a, 400b define a radio access network.

In the case of millimeter wave (mmW) signals the strongest transmission path between the donor network node 200a and the relay network node 200b is the line-of-sight (LOS) path 130, in FIG. 1 denoted reference path-LOS. If the reference path would get blocked the communication between the network nodes 200a, 200b would be interrupted and there would be an access outage for end-users, represented by terminal devices 300a, 300b, served by the relay network node 200b in respective beams 150a, 150a. Examples of terminal devices 300a, 300b are portable wireless devices, mobile stations, mobile phones, handsets, wireless local loop phones, user equipment (UE), smartphones, laptop computers, tablet computers, wireless modems, wireless sensor devices, Internet of Things devices, and network equipped vehicles.

Such an event could be on a short-term time scale and to perform a beam management procedure to find an alternative path moa, mob, in which transmission and/or reception beams are reflected at objects 500a, 500b, to reconfigure the link or even to reroute the communication with the terminal devices 300a, 300b to another relay network node, if possible, will be a comparatively complex task and take time. Since beams are transmitted and received along the paths, the terms beam and path can be used interchangeably.

To mitigate this issue there could be mechanisms that allows for a quick switch to an alternative path and, particularly, a procedure for how both sides of the link get this information. For example, each network node could transmit a reference signal in beams in different directions, where each beam has its own individual signature, or identifier. The network node receiving the reference signals will detect and record the received signal level and calculate Channel Quality Indicators (CQI) such as Signal-to-Noise ratio (SNR), Mean Squared Error (MSE), etc. as well as a delay estimation, resulting from the reference signal received in the individual beams and store the signatures of the beams at least with second highest SNR and optionally also the beam with third largest SNR, etc. These beams will then define secondary beams that might be used as backup beams in case of beam link failure of a currently used beam, whereas the beam with highest SNR (i.e., the LOS beam having been blocked) defines the primary beam.

The secondary beams would thus constitute alternative paths between the two network nodes 200a, 200b, and the CQIs (such as SNR, received power, delay, etc.) would give an indication of what performance to expect if any of the alternative beam settings are used. The network node receiving the reference signals in the alternative paths then makes the decision for which alternative path to use in case the primary beam is blocked and communicates this information (including the CQI information for different beams) to the network node having transmitted the reference signal. When there is a beam link failure causing loss of the LOS path 130, the network nodes 200a, 200b should as soon as possible switch over to the negotiated configuration for the alternative path, resulting in communication in a secondary beam along at least one of the alternative paths 140a, 140b, possible with the use of a different modulation and coding scheme (MCS) than for the primary beam.

Communications network based on transmission and reception of OFDM symbols require good synchronization between the transmitter and the receiver (where the transmitter and the receiver are represented by different network nodes in the communication network). The timing becomes more challenging in multipoint-to-point systems, compared to point-to-point systems. This is because communication in multipoint-to-point systems involves signals from several transmitters to be received simultaneously at one receiver. In order to maintain orthogonality, the signals from different transmitters must be received within the cyclic prefix (CP). If orthogonality is lost this will lead to severe inter-carrier interference (ICI), resulting in receive errors at the receiver.

Hence, there is still a need for improved mechanisms for beam switching.

SUMMARY

An object of embodiments herein is to provide mechanisms allowing for efficient beam switching not suffering from the above issues, or at least where the above issues are mitigated or reduced.

According to a first aspect there is presented a method for transmit timing adjustment. The method is performed by a second network node. The method comprises obtaining an indication of beam link failure of a current beam. The current beam is used for ongoing communication with a first network node. The method comprises switching over to a backup beam of the current beam for continuing the ongoing communication with the first network node. The method comprises adjusting transmit timing for transmitting a signal as part of the ongoing communication in the backup beam based on earlier communicated timing information with the first network node before making any transmission of the signal on the backup beam.

According to a second aspect there is presented a second network node for transmit timing adjustment. The second network node comprises processing circuitry. The processing circuitry is configured to cause the second network node to obtain an indication of beam link failure of a current beam. The current beam is used for ongoing communication with a first network node. The processing circuitry is configured to cause the second network node to switch over to a backup beam of the current beam for continuing the ongoing communication with the first network node. The processing circuitry is configured to cause the second network node to adjust transmit timing for transmitting a signal as part of the ongoing communication in the backup beam based on earlier communicated timing information with the first network node before making any transmission of the signal on the backup beam.

According to a third aspect there is presented a second network node for transmit timing adjustment. The second network node comprises an obtain module configured to obtain an indication of beam link failure of a current beam. The current beam is used for ongoing communication with a first network node. The second network node comprises a switch module configured to switch over to a backup beam of the current beam for continuing the ongoing communication with the first network node. The second network node comprises an adjust module configured to adjust transmit timing for transmitting a signal as part of the ongoing communication in the backup beam based on earlier communicated timing information with the first network node before making any transmission of the signal on the backup beam.

According to a fourth aspect there is presented a computer program for transmit timing adjustment. The computer program comprises computer program code which, when run on processing circuitry of a second network node, causes the second network node to perform a method according to the first aspect.

According to a fifth aspect there is presented a method for enabling transmit timing adjustment at a second network node. The method is performed by a first network node. The method comprises obtaining an indication of beam link failure of a current beam. The current beam is used for ongoing communication with the second network node. The method comprises switching over to a backup beam of the current beam for continuing the ongoing communication. The method comprises receiving a signal on the backup beam and from the second network node. The signal has an adjusted transmit timing based on earlier communicated timing information with the first network node.

According to a sixth aspect there is presented a first network node for enabling transmit timing adjustment. The first network node comprises processing circuitry. The processing circuitry is configured to cause the first network node to obtain an indication of beam link failure of a current beam. The current beam is used for ongoing communication with the second network node. The processing circuitry is configured to cause the first network node to switch over to a backup beam of the current beam for continuing the ongoing communication. The processing circuitry is configured to cause the first network node to receive a signal on the backup beam and from the second network node. The signal has an adjusted transmit timing based on earlier communicated timing information with the first network node.

According to a seventh aspect there is presented a first network node for enabling transmit timing adjustment. The first network node comprises an obtain module configured to obtain an indication of beam link failure of a current beam. The current beam is used for ongoing communication with the second network node. The first network node comprises a switch module configured to switch over to a backup beam of the current beam for continuing the ongoing communication. The first network node comprises a receive module configured to receive a signal on the backup beam and from the second network node. The signal has an adjusted transmit timing based on earlier communicated timing information with the first network node.

in some aspects there is provided a radio access network node comprising a first network node as herein disclosed and/or a second network node as herein disclosed According to an eight aspect there is presented a computer program for enabling transmit timing adjustment. The computer program comprises computer program code which, when run on processing circuitry of a first network node, causes the first network node to perform a method according to the fifth aspect.

According to a ninth aspect there is presented a computer program product comprises a computer program according to at least one of the fourth aspect and the eight aspect and a computer readable storage medium on which the computer program is stored. The computer readable storage medium could be a non-transitory computer readable storage medium.

According to a tenth aspect there is presented a radio access network node comprising a first network node according to the second or third aspects and/or a second network node according to the sixth or seventh aspects.

Advantageously these methods, these first network nodes, these second network nodes, this radio access network node, and these computer programs enable efficient beam switching that does not suffer from the above issues.

Advantageously these methods, these first network nodes, these second network nodes, this radio access network node, and these computer programs enable the handshaking delays between the network nodes to be minimized when switching to the backup beam, leading to low end-to-end packet transmission delay.

Advantageously these methods, these first network nodes, these second network nodes, this radio access network node, and these computer programs enable the transmit timing to be correctively adjusted, leading to improved throughput. In many cases a correct timing is a prerequisite for maintaining the ongoing communications, i.e., to get a throughput larger than zero.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 7 is a schematic diagram showing functional units of a network node according to an embodiment;

FIG. 8 is a schematic diagram showing functional modules of a network node according to an embodiment; and FIG. 9 shows one example of a computer program product comprising computer readable means according to an embodiment.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein thus relate to mechanisms for enabling transmit timing adjustment and transmit timing adjustment. In order to obtain such mechanisms there is provided a first network node 200a, a method performed by the first network node 200a, a computer program product comprising code, for example in the form of a computer program, that when run on processing circuitry of the first network node 200a, causes the first network node 200a to perform the method. In order to obtain such mechanisms there is further provided a second network node 200b, a method performed by the second network node 200b, and a computer program product comprising code, for example in the form of a computer program, that when run on processing circuitry of the second network node 200b, causes the second network node 200b to perform the method.

Figure 2:
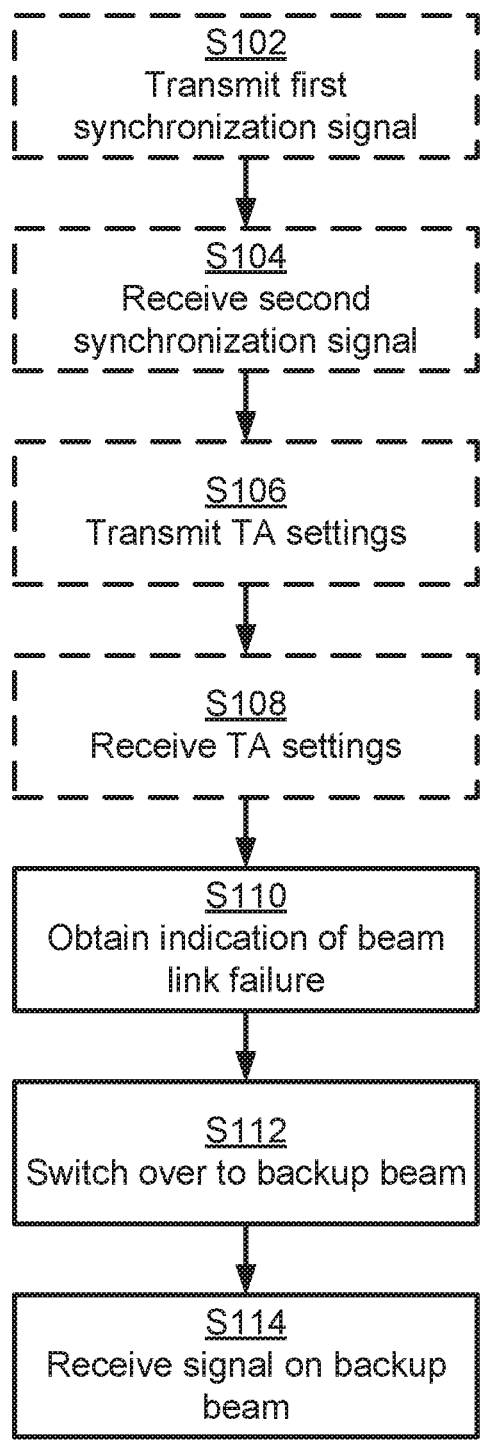
FIGS. 2 and 3 are flowcharts of methods according to embodiments.

Reference is now made to FIG. 2 illustrating a method for enabling transmit timing adjustment as performed by the first network node 200a according to an embodiment.

It is assumed that the first network node 200a communicates with the second network node 200b and that a beam link failure occurs. Hence the first network node 200a is configured to perform step S110:

S110: The first network node 200a obtains an indication of beam link failure of a current beam. The current beam is used for ongoing communication with the second network node 200b. Typically the current beam is a primary beam. But it could also be one of the secondary beams.

The ongoing communication is to be continued and a switch is therefore made to a backup beam. Hence the first network node 200a is configured to perform step S112:

S112: The first network node 200a switches over to a backup beam of the current beam for continuing the ongoing communication. Typically, the backup beam is a secondary beam. But it could also be the primary beam.

Since the backup beam typically has a different propagation path than the current beam, the second network node 200b adjusts its transmit timing before transmitting signals to the first network node 200a. Thus, the first network node 200a is configured to perform step S114:

S114: The first network node 200a receives a signal on the backup beam and from the second network node 200b. As will be further disclosed below, the signal as transmitted by the second network node 200b has an adjusted transmit timing. The transmit timing has been adjusted by the second network node 200b based on earlier communicated timing information with the first network node 200a.

Embodiments relating to further details of enabling transmit timing adjustment as performed by the first network node 200a will now be disclosed.

There could be different ways for the transmit timing to be adjusted.

In some aspects the transmit timing is adjusted by means of timing advance (TA) settings. That is, according to an embodiment the timing information is based on timing advance settings provided by the first network node 200a. In some aspects, for a time-division duplex (TDD) system the timing advance setting implies that the so-called guard period is changed. The guard period can be defined as a period in time during which no transmission and no reception occurs. Further in this respect, the first network node 200a might transmit timing advance settings comprising a timing advance command in each alternative beam (such as in the primary beams and the secondary beams). Each timing advance command is thus associated with one alternative beam.

In some aspects the transmit timing is adjusted based on synchronization signals. That is, according to an embodiment the timing information is based on synchronization signals having been communicated between the first network node 200a and the second network node 200b.

There could be different ways for the synchronization signals to be communicated between the first network node 200a and the second network node 200b.

In some aspects the first network node 200a transmits a first reference signal to the second network node 200b. Particularly, according to an embodiment the first network node 200a is configured to perform (optional) step S102:

S102: The first network node 200a transmits, to the second network node 200b, a respective first synchronization signal in the current beam and in the backup beam.

Hence, one synchronization signal is transmitted in each beam. Typically each such synchronization signal has its own identifier (as defined by the beam in which the reference signal is transmitted).

As will be further disclosed below, this enables the second network node 200b to coarsely adjusts its transmit timing and receive timing for the current beam and the backup beam.

In some aspects the second network node 200b responds by transmitting a second synchronization signal to the first network node 200a. Particularly, according to an embodiment the first network node 200a is configured to perform (optional) step S104:

S104: The first network node 200a receives, from the second network node 200b, a respective second synchronization signal in the current beam and in the backup beam.

Again, one synchronization signal is received in each beam. Typically, each such synchronization signal has its own identifier (as defined by the beam in which the reference signal is transmitted).

The first network node 200a then uses the second synchronization signal as received in the different beams to derive timing advance settings for the second network node 200b. The timing advance settings are then transmitted to the second network node 200b. Particularly, according to an embodiment the first network node 200a is configured to perform (optional) step S106:

S106: The first network node 200a transmits, to the second network node 200b, timing advance settings for the current beam and the backup beam.

There could be different examples of the synchronization signals. Each synchronization signal could be a Synchronization Signal Block (SSB) which constitutes of one primary synchronization signal (PSS), one secondary synchronization signal (SSS) and physical broadcast channel (PBCH) signals. Each synchronization signal could be a random access (RA) preamble. Further, each synchronization signal could be a channel state information reference signal (CSI-RS), a demodulation reference signal (DMRS) or sounding reference signal (SRS). According to some non-limiting examples each of the first synchronization signal and the second synchronization signal is a PSS, an SSS, an RA preamble, a DMRS, a CSI-RS, or an SRS.

In some aspects also the second network node 200b transmits timing advance settings. Particularly, according to an embodiment the first network node 200a is configured to perform (optional) step S108:

S108: The first network node 200a receives, from the second network node 200b, timing advance settings for the current beam and the backup beam.

The first network node 200a might then adapts its own transmit timing accordingly.

Figure 3:
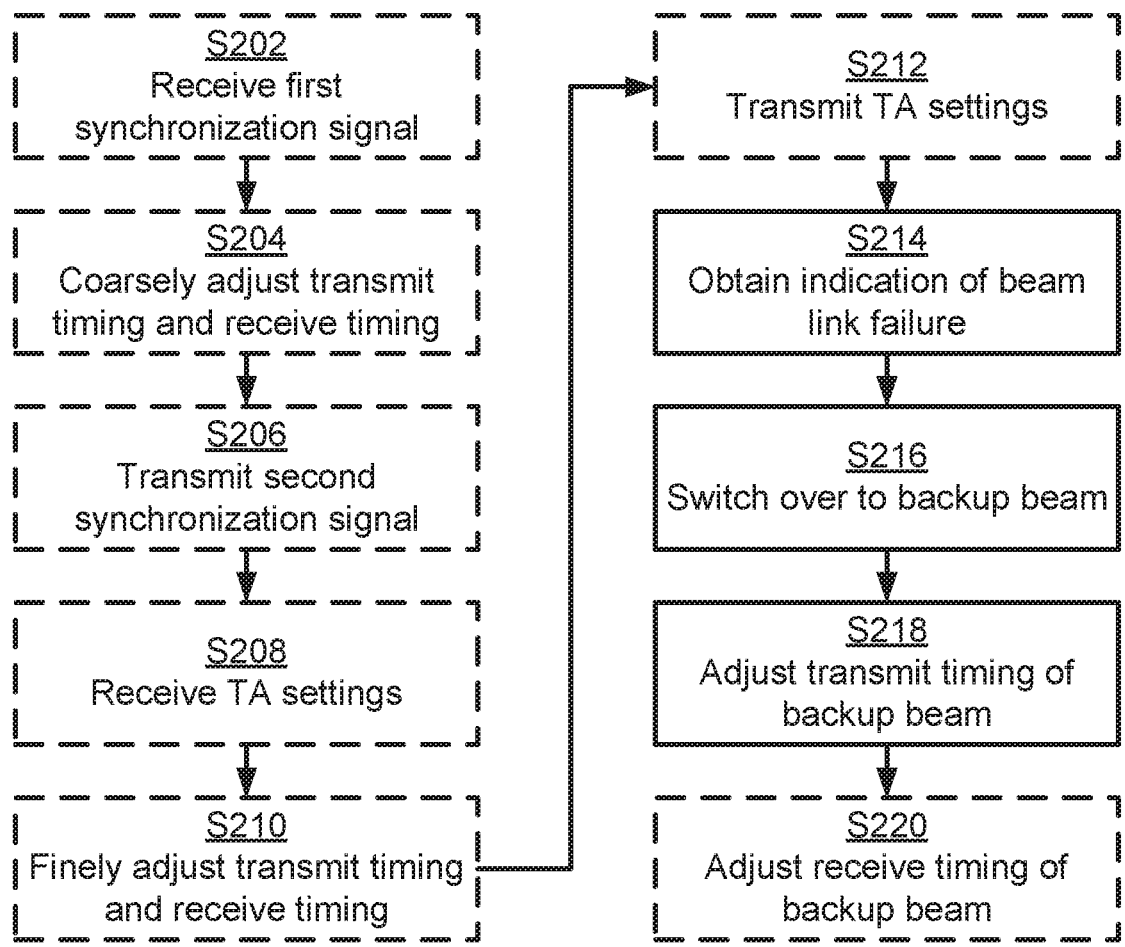

Reference is now made to FIG. 3 illustrating a method for transmit timing adjustment as performed by the second network node 200b according to an embodiment.

As disclosed above, it is assumed that the first network node 200a communicates with the second network node 200b and that a beam link failure occurs. Hence the second network node 200b is configured to perform step S214:

S214: The second network node 200b obtains an indication of beam link failure of a current beam, wherein the current beam is used for ongoing communication with a first network node 200a. Typically the current beam is a primary beam. But it could also be one of the secondary beams.

The ongoing communication is to be continued and a switch is therefore made to a backup beam. Hence the second network node 200b is configured to perform step S216:

S216: The second network node 200b switches over to a backup beam of the current beam for continuing the ongoing communication with the first network node 200a. Typically the backup beam is a secondary beam. But it could also be the primary beam.

As noted above, since the backup beam typically has a different propagation path than the current beam, the second network node 200b adjusts its transmit timing before transmitting signals to the first network node 200a.

Thus, the second network node 200b is configured to perform step S218:

S218: The second network node 200b adjusts transmit timing for transmitting a signal as part of the ongoing communication in the backup beam. The transmit timing is adjusted based on earlier communicated timing information with the first network node 200a. The transmit timing is adjusted before the second network node 200b makes any transmission of the signal on the backup beam.

Embodiments relating to further details of transmit timing adjustment as performed by the second network node 200b will now be disclosed.

As disclosed above, there could be different ways for the transmit timing to be adjusted.

As disclosed above, in some aspects the transmit timing is adjusted by means of timing advance settings. That is, according to an embodiment the timing information is based on timing advance settings received from the first network node 200a.

In this respect, one timing advance setting could be received per beam. Hence, according to an embodiment the timing advance settings are received for the current beam and for the backup beam.

As further disclosed above, in some aspects the transmit timing is adjusted based on synchronization signals. That is, according to an embodiment the timing information is based on synchronization signals having been communicated between the first network node 200a and the second network node 200b.

There could be different ways for the synchronization signals to be communicated between the first network node 200a and the second network node 200b.

In some aspects the first network node 200a transmits a first reference signal to the second network node 200b. Particularly, according to an embodiment the second network node 200b is configured to perform (optional) step S202:

S202: The second network node 200b receives, from the first network node 200a, a respective first synchronization signal in the current beam and in the backup beam.

The second network node 200b can then coarsely adjust is transmit timing and receive timing. Particularly, according to an embodiment the second network node 200b is configured to perform (optional) step S204:

S204: The second network node 200b coarsely adjusts its transmit timing and receive timing for the current beam and the backup beam based on the first synchronization signal as received only in the current beam.

As disclosed above, in some aspects the second network node 200b then transmits a second synchronization signal to the first network node 200a. Particularly, according to an embodiment the second network node 200b is configured to perform (optional) step S206:

S206: The second network node 200b transmits, to the first network node 200a, a respective second synchronization signal in the current beam and in the backup beam.

As disclosed above, the first network node 200a responds by transmitting timing advance settings. Particularly, according to an embodiment the second network node 200b is configured to perform (optional) step S208:

S208: The second network node 200b receives, from the first network node 200a, timing advance settings for the current beam and the backup beam.

The second network node 200b can then finely adjust is transmit timing and receive timing. Particularly, according to an embodiment the second network node 200b is configured to perform (optional) step S210:

S210: The second network node 200b finely adjusts the transmit timing and the receive timing for the current beam based on the timing advance settings as received only in the current beam.

Further, in some aspects the second network node 200b derives a timing adjustment factor for the backup beam. In general terms, the timing adjustment factor is determined based on timing information, such as timing advance settings, for both the current beam and the backup beam.

Particularly, according to an embodiment the timing information is defined by the timing advance settings and the first synchronization signal as received in the backup beam. The timing information is then used to derive a timing adjustment factor by which the transmit timing is adjusted before the second network node 200*b* makes any transmission of the transmit signal on the backup beam.

The timing estimates for both the current beam and the backup beam can be indicated from the second network node 200*b* to the first network node 200*a*. Then, the timing advance can be adjusted in the process of switching from the current beam to the backup beam.

As disclosed above, in some aspects also the second network node 200*b* transmits timing advance settings. Particularly, according to an embodiment the second network node 200*b* is configured to perform (optional) step S212:

S212: The second network node 200*b* transmits, to the first network node 200*a*, timing advance settings for the current beam and the backup beam.

These timing advance settings might be derived in the same manner as the timing advance settings derived by the first network node 200*a*, thus involving synchronization signals to be communicated between the second network node 200*b* and the first network node 200*a*. Further in this respect, in some aspects both the first network node 200*a* and the second network node 200*b* change transmit timings, after a change in beam (to the backup beam) between the network nodes 200*a*, 200*b*. Both network nodes 200*a*, 200*b* might then transmit more than one timing advance command with timing advance settings to the other network node 200*a*, 200*b*, where each timing advance command is associated with one beam (such as one primary or one secondary beam).

In some aspects the second network node 200*b* also adjusts its receive timing for signals received from the first network node 200*a*. Particularly, according to an embodiment the second network node 200*b* is configured to perform (optional) step S220:

S220: The second network node 200*b* adjusts receive timing for receiving another signal as part of the ongoing communication in the backup beam with the first network node 200*a* before making any reception of this another signal on the backup beam.

In some aspects the receive timing is adjusted based on measurements made by the second network node 200*b*. The measurements are typically made on signals, such as the above mentioned first synchronization signal, received by the second network node 200*b* in the primary beam and the secondary beams.

Figure 1:
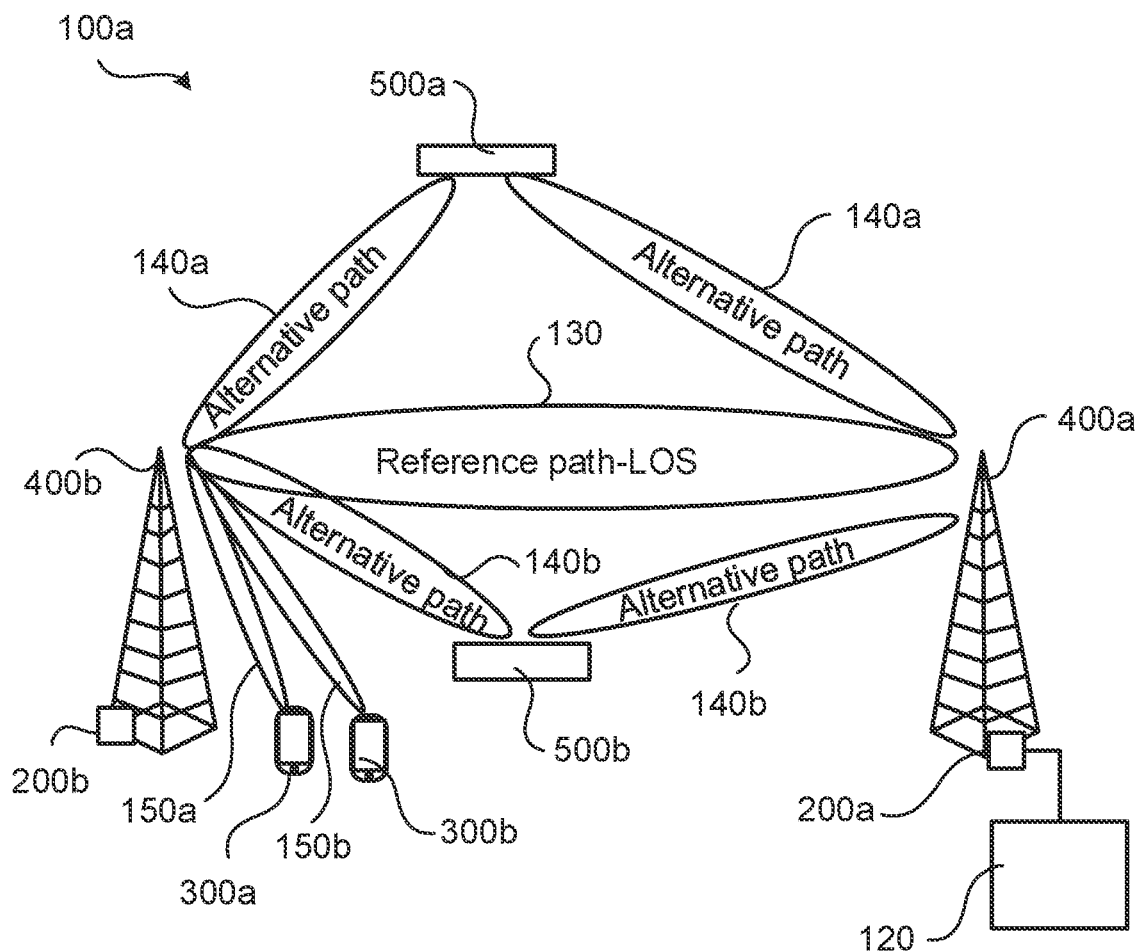
FIGS. 1 and 4 are schematic diagram illustrating communications networks.
Figure 4:
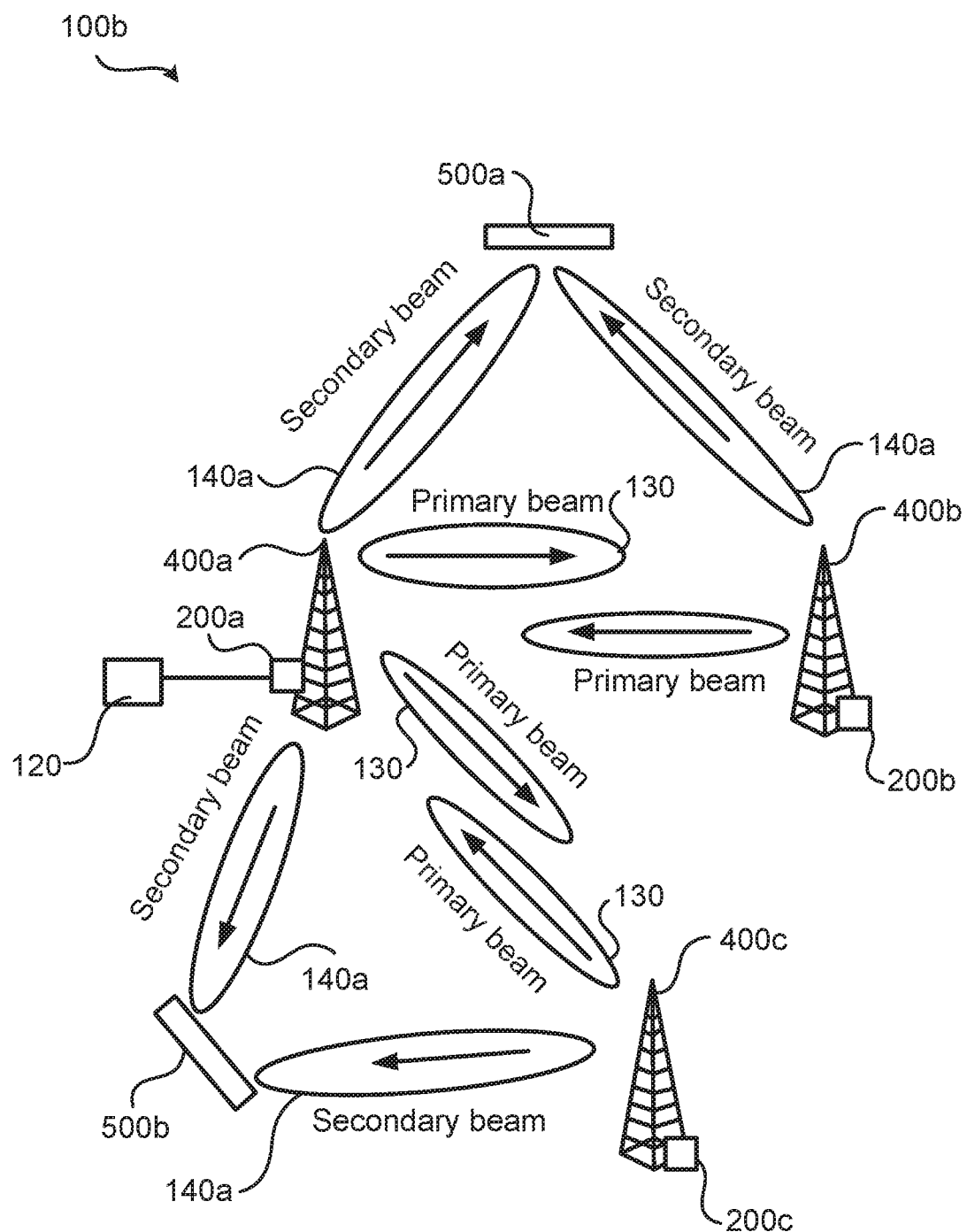

In some aspects the first network node 200*a* and the second network node 200*b* are part of a multi-hop communication network, such as the communications networks bow in FIGS. 1 and 100*b* in FIG. 4.

Further aspects, embodiments, and examples of the herein disclosed inventive concept will now be disclosed with reference to the communications network 100*b* of FIG. 4. The communications network 100*b* is similar to that of FIG. 1 but additionally comprises a third network node 200*c* operatively connected to its own radio access network node 400*c*. The network nodes 200*a*, 200*b*, 200C communicate with each other, via the radio access network nodes 400*a*, 400*b*, 400*c*, in beams 130, Ana. Both a primary beam 130 and a secondary beam 140*a* might be identified between each pair of network nodes.

When the second network node 200*b* detects a beam link failure on a current beam (for example the primary LOS beam 130) used for ongoing communication with the first network node 200*a*, then the second network node 200*b* switches to a backup beam (for example the secondary beam moa) according to an agreement with the first network node 200*a*, and also adjusts its transmit timing. At the same time, the first network node 200*a* will also detect the beam link failure and change to its backup beam (for example the secondary beam 140*a*).

Beam link failure might, e.g., be based on one, or both, of the network nodes 200*a*, 200*b* not receiving any acknowledgement (ACK), or receiving only a negative acknowledgement (NACK), for transmitted payload within a specific time interval. The beam link failure might further be based on a measure on a signal quality, where beam link failure is identified when a signal quality is below a predefined threshold. By signal quality, CQIs such as received power, SNR, signal to interference plus noise ratio (SINR), MSE, Block Error Rate (BLER), Bit Error Rate (BER), etc.

There could be different ways for the second network node 200*b* to adjust the receive timing.

Figure 5:
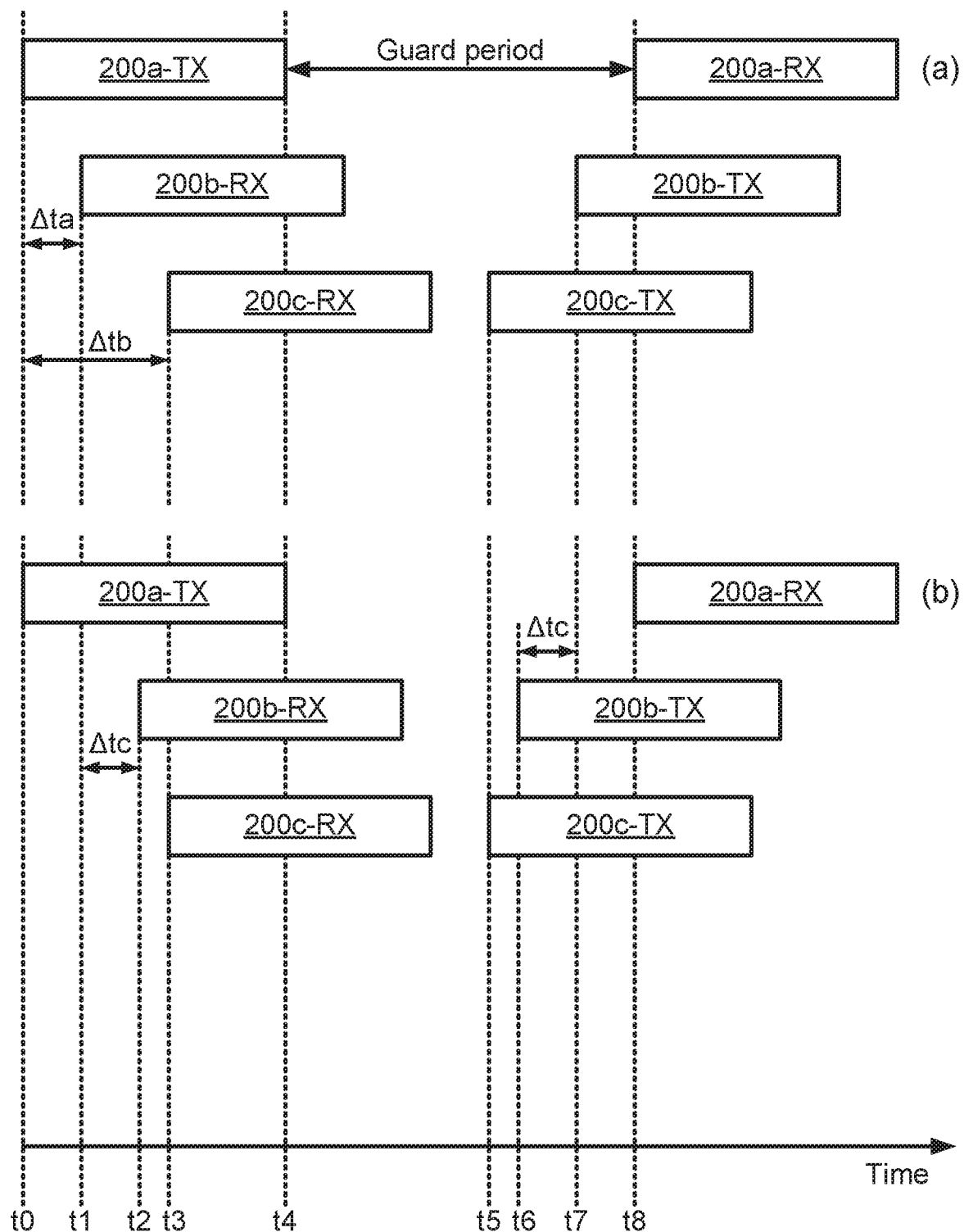
FIG. 5 schematically illustrates changes in transmit timing and receive timing according to an embodiment.

Reference is here made to FIG. 5. FIG. 5 schematically illustrates changes in transmit timing and receive timing according to an embodiment. FIG. 5. illustrates timings for transmissions (TX) and receptions (RX) at network nodes 200*a*, 200*b*, 200C in the communications network 100*b* of FIG. 4. The notation 200*x*-TX represents transmission from network node 200*x*, and the notation 200*x*-RX represents reception at network node 200*x*, where x is either a, b, or c. FIG. 5(*a*) illustrates a scenario where the primary beams 130 are used as current beams for communications between network nodes 200*a* and 200*b*, and FIG. 5(*b*) illustrates a scenario where a switch to the secondary beams Ana as backup beams has been made for continuing the communications between network nodes 200*a* and 200*b*. In FIG. 5(*a*) a transmission from network node 200*a* (as identified by 200*a*-TX) is made at time to. This transmission is by network node 200*b* received at time t1 (with a propagation time $\Delta ta=t1-t0$) and is by network node 200C received at time t3 (with a propagation time $\Delta tb=t3-t0$). Further, in FIG. 5(*a*) a transmission from network node 200C (as identified by 200*c*-TX) is made at time t5. This transmission is by network node 200*a* received at time t8. In FIG. 5(*a*) a transmission from network node 200*b* (as identified by 200*b*-TX) is made at time t7. This transmission is by network node 200*a* also received at time t8. After the switch to the backup beam, the propagation delay increases and network node 200*b* therefore adjusts its transmit timing and receiving timing by a value $\Delta tc$ (where $\Delta ta+\Delta tc$ corresponds to the new propagation time), where the reception at network node 200*b* thus is delayed from time t1 to time $t_3=t1+\Delta tc$ and the transmission by network node 200*b* thus is advanced from time t7 to time $t5=t7-\Delta tc$. Because of the adjusted transmit timing and receive timing at network node 200*b* the transmission from network node 200*a* can still be made at time to and the reception at network node 200*a* can still made at time t8. No change of transmit timing and receive timing is needed by network node 200C. However, if the guard period were shorter it could be that time $t_5$ (or time t6) would occur before the reception 200*c*-RX (or 200*b*-RX) of the transmission 200*a* was complete. The guard period could then be lengthened should such a situation occur.

Thus, in some aspects the receive timing is adjusted as a delay (i.e., moved later time) with the same amount as the transmit timing is advanced (i.e., moved earlier in time), as compared to the transmit timing and receive timing before the adjustments. If the reference timing in the second network node 200*b* is the receive timing, then the adjustment of the transmit timing relative to the receive timing is advanced twice the amount of the amount of delayed receive timing. Thus, according to an embodiment the receive timing is adjusted to the same amount, but with opposite direction, as the amount the transmit timing is adjusted.

Figure 6:
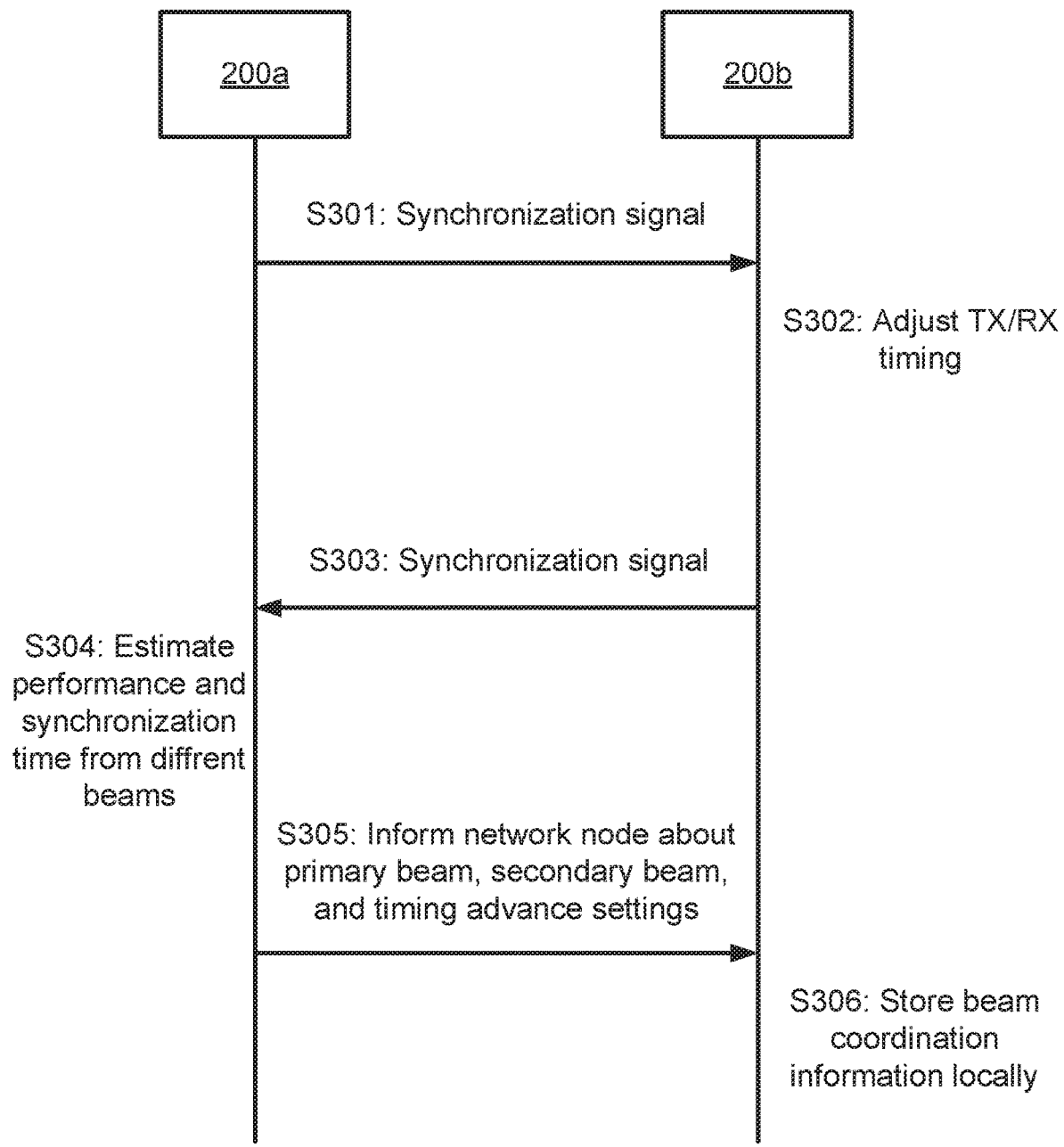
FIG. 6 is a signalling diagram according to an embodiment.

One particular embodiment for transmit timing adjustment, and for enabling the same, based on at least some of the above disclosed embodiments will now be disclosed in detail with reference to the signalling diagram of FIG. 6.

S301: The first network node 200a transmits first synchronization signals in beams towards the second network node 200a. The first synchronization signals are thus received by the second network node 200b. One way to implement step S301 is to perform step S102 and step S202.

S302: The second network node 200b coarsely adjusts its transmit (TX) timing and receive (RX) timing based on the received first synchronization signals. One way to implement step S302 is to perform step S204.

S303: The second network node 200b transmits second synchronization signals in beams towards the first network node 200b. The second synchronization signals are thus received by the first network node 200a. One way to implement step S303 is to perform step S104 and step S206.

S304: The first network node 200a estimates the signal quality of the received second synchronization signals and timing difference between the transmitted and the received synchronization signals for more than one beam direction.

S305: The first network node 200a informs the second network node 200b about one primary beam with timing advance settings, and one or more secondary beams with corresponding timing advance setting(s). The second network node 200b thus receives this information. One way to implement step S305 is to perform step S106 and step S208.

S306: The second network node 200b stores the received information locally and derives one timing adjustment factor for each secondary beam, where the timing adjustment factors are applied when the secondary beams are used as backup beams for the primary beam upon indication of abeam link failure of the primary beam being used as current beam for ongoing communication between the first network node 200a and the second network node 200b. One way to implement step S306 is to perform step S210.

The procedure in FIG. 6 can be periodically repeated. The periodicity might be based on measurements of the radio propagation environment.

FIG. 7 schematically illustrates, in terms of a number of functional units, the components of a network node 200a, 200b according to an embodiment. The network node 200a, 200b could alternatingly operate as either the first network node 200a, or the second network node 200b. Processing circuitry 210 is provided using any combination of one or more of a suitable central processing unit (CPU), multiprocessor, microcontroller, digital signal processor (DSP), etc., capable of executing software instructions stored in a computer program product 910a, 910b (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200a, 200b to perform a set of operations, or steps, as disclosed above. For example, the storage medium 230 may store the set of operations, and the processing circuitry 210 may be configured to retrieve the set of operations from the storage medium 230 to cause the network node 200a, 200b to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200a, 200b may further comprise a communications interface 220 for communications with other entities, nodes, functions, and devices of the communications networks 100a, 100b. As such the communications interface 220 may comprise one or more transmitters and receivers, comprising analogue and digital components.

The processing circuitry 210 controls the general operation of the network node 200a, 200b e.g. by sending data and control signals to the communications interface 220 and the storage medium 230, by receiving data and reports from the communications interface 220, and by retrieving data and instructions from the storage medium 230. Other components, as well as the related functionality, of the network node 200a, 200b are omitted in order not to obscure the concepts presented herein.

FIG. 8 schematically illustrates, in terms of a number of functional modules, the components of a network node 200a, 200b according to an embodiment.

When acting as a first network node 200a it comprises an obtain module 210e configured to perform step S110, a switch module 210f configured to perform step S112, and a receive module 210g configured to perform step S114. When acting as a first network node 200a it may further comprise a number of optional functional modules, such as any of a transmit module 210a configured to perform step S102, a receive module 210b configured to perform step S104, a transmit module 210C configured to perform step S106, and a receive module 210d configured to perform step S108.

When acting as a second network node 200b it comprises an obtain module 210n configured to perform step S214, a switch module 210o configured to perform step S216, and an adjust module 210p configured to perform step S218. When acting as a second network node 200b it may further comprise a number of optional functional modules, such as any of a receive module 210h configured to perform step S202, an adjust module 210i configured to perform step S204, a transmit module 210j configured to perform step S206, a receive module 210k configured to perform step S208, an adjust module 210l configured to perform step S210, a transmit module 210M configured to perform step S212, and an adjust module configured to perform step S220.

In general terms, each functional module 210a-210q may be implemented in hardware or in software. Preferably, one or more or all functional modules 210a-210q may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210q and to execute these instructions, thereby performing any steps of the network node 200a, 200b as disclosed herein.

The network node 200a, 200b may be provided as a standalone device or as a part of at least one further device. For example, the network node 200a, 200b may be provided in a radio access network node 400a, 400b or in a core network node. Thus, in some aspects there is provided a radio access network node 400a, 400b comprising a first network node 200a as herein disclosed and/or a second network node 200b as herein disclosed. Alternatively, functionality of the network node 200a, 200b may be distributed between at least two devices, or nodes. These at least two nodes, or devices, may either be part of the same network part (such as the radio access network or the core network) or may be spread between at least two such network parts.

In general terms, instructions that are required to be performed in real time may be performed in a device, or node, operatively closer to the radio access network than instructions that are not required to be performed in real time.

Thus, a first portion of the instructions performed by the network node 200a, 200b may be executed in a first device, and a second portion of the of the instructions performed by the network node 200a, 200b may be executed in a second device; the herein disclosed embodiments are not limited to any particular number of devices on which the instructions performed by the network node 200a, 200b may be executed. Hence, the methods according to the herein disclosed embodiments are suitable to be performed by a network node 200a, 200b residing in a cloud computational environment. Therefore, although a single processing circuitry 210 is illustrated in FIG. 7 the processing circuitry 210 may be distributed among a plurality of devices, or nodes. The same applies to the functional modules 210a-210q of FIG. 8 and the computer programs 920a, 920b of FIG. 9 (see below). One advantages with having network node 200a, 200b residing in a cloud computational environment is that it might enable global computation and coordination processing to be performed, in contrast to locally deployed network node 200a, 200b where the links might be optimized only based on local requirements. One advantage of having local network nodes 200a, 200b is that it might allow for faster beam search and selection.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the first network node 200a as herein disclosed. On this computer readable means 930, a computer program 920b can be stored, which computer program 920b can cause the processing circuitry 210 and thereto operatively coupled entities and devices, such as the communications interface 220 and the storage medium 230, to execute methods according to embodiments described herein. The computer program 920b and/or computer program product 910b may thus provide means for performing any steps of the second network node 200b as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for transmit timing adjustment, the method being performed by a second network node, the method comprising:
   receiving, from a first network node, a respective first synchronization signal in a current beam and in a backup beam;
   coarsely adjusting transmit timing and receive timing for the current beam and the backup beam based on the first synchronization signal as received only in the current beam;
   obtaining an indication of beam link failure of the current beam, wherein the current beam is used for ongoing communication with the first network node;
   switching over to the backup beam of the current beam for continuing the ongoing communication with the first network node; and
   adjusting the transmit timing for transmitting a signal as part of the ongoing communication in the backup beam based on earlier communicated timing information with the first network node before making any transmission of the signal on the backup beam.

2. The method of claim 1, further comprising:
   adjusting the receive timing for receiving another signal as part of the ongoing communication in the backup beam with the first network node before making any reception of said another signal on the backup beam.

3. The method of claim 2, wherein the receive timing is adjusted to same amount but with opposite direction as the transmit timing is adjusted.

4. The method of claim 2, wherein the receive timing is adjusted based on measurements made by the second network node.

5. The method of claim 1, wherein the timing information is based on timing advance settings received from the first network node.

6. The method of claim 5, wherein the timing advance settings are received for the current beam and for the backup beam.

7. The method of claim 1, wherein the timing information is based on synchronization signals having been communicated between the first network node and the second network node.

8. The method of claim 1, further comprising:
   transmitting, to the first network node, a respective second synchronization signal in the current beam and in the backup beam;
   receiving, from the first network node, timing advance settings for the current beam and the backup beam; and
   finely adjusting the transmit timing and the receive timing for the current beam based on the timing advance settings as received only in the current beam.

9. The method of claim 8, wherein the timing information is defined by the timing advance settings and the first synchronization signal as received in the backup beam, and wherein the timing information is used to derive a timing adjustment factor by which the transmit timing is adjusted before making any transmission of the transmit signal on the backup beam.

10. The method of claim 8, wherein each of the first synchronization signal and the second synchronization signal is a primary synchronization signal, a secondary synchronization signal, a random access preamble, a demodulation reference signal, or a sounding reference signal.

11. The method of claim 1, further comprising:
    transmitting, to the first network node, timing advance settings for the current beam and the backup beam.

12. The method of claim 1, wherein the first network node and the second network node are part of a multi-hop communication network.

13. A method for enabling transmit timing adjustment at a second network node, the method being performed by a first network node, the method comprising:
    receiving, from the second network node, a respective second synchronization signal in a current beam and in a backup beam;
    using the second synchronization signal as received in the current beam and in the backup beam to derive timing advance settings for the second network node;
    transmitting, to the second network node, the timing advance settings for the current beam and the backup beam;
    obtaining an indication of beam link failure of the current beam, wherein the current beam is used for ongoing communication with the second network node;
    switching over to the backup beam of the current beam for continuing the ongoing communication; and
    receiving a signal on the backup beam and from the second network node, wherein the signal has an adjusted transmit timing based on earlier communicated timing information with the first network node;
    wherein the adjusted transmit timing of the signal is adjusted based on the timing advance settings for the backup beam.

14. The method of claim 13, wherein the timing information is based on the timing advance settings provided by the first network node.

15. The method of claim 13, wherein the timing information is based on synchronization signals having been communicated between the first network node and the second network node.

16. The method of claim 13, further comprising:
    transmitting, to the second network node, a respective first synchronization signal in the current beam and in the backup beam.

17. The method of claim 13, further comprising:
    receiving, from the second network node, the timing advance settings for the current beam and the backup beam.

18. The method of claim 13, wherein the first network node and the second network node are part of a multi-hop communication network.

19. A second network node for transmit timing adjustment, the second network node comprising processing circuitry, the processing circuitry being configured to cause the second network node to:
    receive, from a first network node, a respective first synchronization signal in a current beam and in a backup beam;
    coarsely adjust transmit timing and receive timing for the current beam and the backup beam based on the first synchronization signal as received only in the current beam;
    obtain an indication of beam link failure of the current beam, wherein the current beam is used for ongoing communication with the first network node;
    switch over to the backup beam of the current beam for continuing the ongoing communication with the first network node; and
    adjust the transmit timing for transmitting a signal as part of the ongoing communication in the backup beam based on earlier communicated timing information with the first network node before making any transmission of the signal on the backup beam.

20. A radio access network comprising a second network node according to claim 19.

21. A first network node for enabling transmit timing adjustment, the first network node comprising processing circuitry, the processing circuitry being configured to cause the first network node to:
    receive, from a second network node, a respective second synchronization signal in a current beam and in a backup beam;
    use the second synchronization signal as received in the current beam and in the backup beam to derive timing advance settings for the second network node;
    transmit, to the second network node, timing advance settings for the current beam and the backup beam;
    obtain an indication of beam link failure of the current beam, wherein the current beam is used for ongoing communication with the second network node;
    switch over to the backup beam of the current beam for continuing the ongoing communication; and
    receive a signal on the backup beam and from the second network node, wherein the signal has an adjusted transmit timing based on earlier communicated timing information with the first network node;
    wherein the adjusted transmit timing of the signal is adjusted based on the timing advance settings for the backup beam.

22. A computer program product comprising a non-transitory computer readable medium storing a computer program for transmit timing adjustment, the computer program comprising computer code which, when run on processing circuitry of a second network node, causes the second network node to:
    receive, from a first network node, a respective first synchronization signal in a current beam and in a backup beam;
    coarsely adjust transmit timing and receive timing for the current beam and the backup beam based on the first synchronization signal as received only in the current beam;
    obtain an indication of beam link failure of the current beam, wherein the current beam is used for ongoing communication with the first network node;
    switch over to the backup beam of the current beam for continuing the ongoing communication with the first network node; and
    adjust the transmit timing for transmitting a signal as part of the ongoing communication in the backup beam based on earlier communicated timing information with the first network node before making any transmission of the signal on the backup beam.

23. A computer program product comprising a non-transitory computer readable medium storing a computer program for enabling transmit timing adjustment, the computer program comprising computer code which, when run on processing circuitry of a first network node, causes the first network node to:
    receive, from a second network node, a respective second synchronization signal in a current beam and in a backup beam;
    use the second synchronization signal as received in the current beam and in the backup beam to derive timing advance settings for the second network node;
    transmit, to the second network node, timing advance settings for the current beam and the backup beam;

obtain an indication of beam link failure of the current beam, wherein the current beam is used for ongoing communication with the second network node;

switch over to the backup beam of the current beam for continuing the ongoing communication; and receive a signal on the backup beam and from the second network node, wherein the signal has an adjusted transmit timing based on earlier communicated timing information with the first network node;

wherein the adjusted transmit timing of the signal is adjusted based on the timing advance settings for the backup beam.

\* \* \* \* \*